Oct. 14, 1952 — L. F. MOHNS — 2,613,785
CLUTCH PLATE WITH VIBRATION DAMPENER
Filed July 10, 1947 — 2 SHEETS—SHEET 1
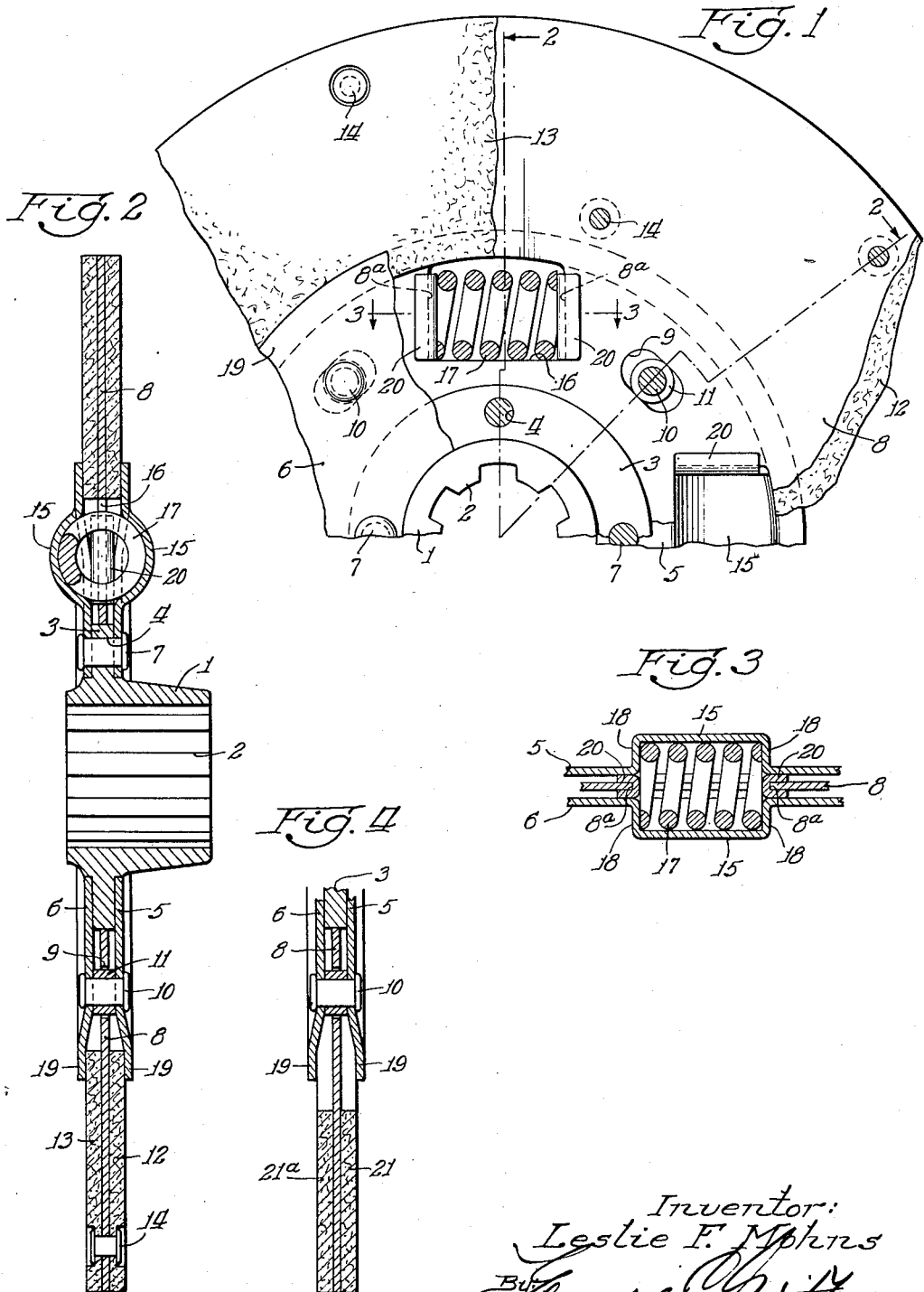
Inventor:
Leslie F. Mohns

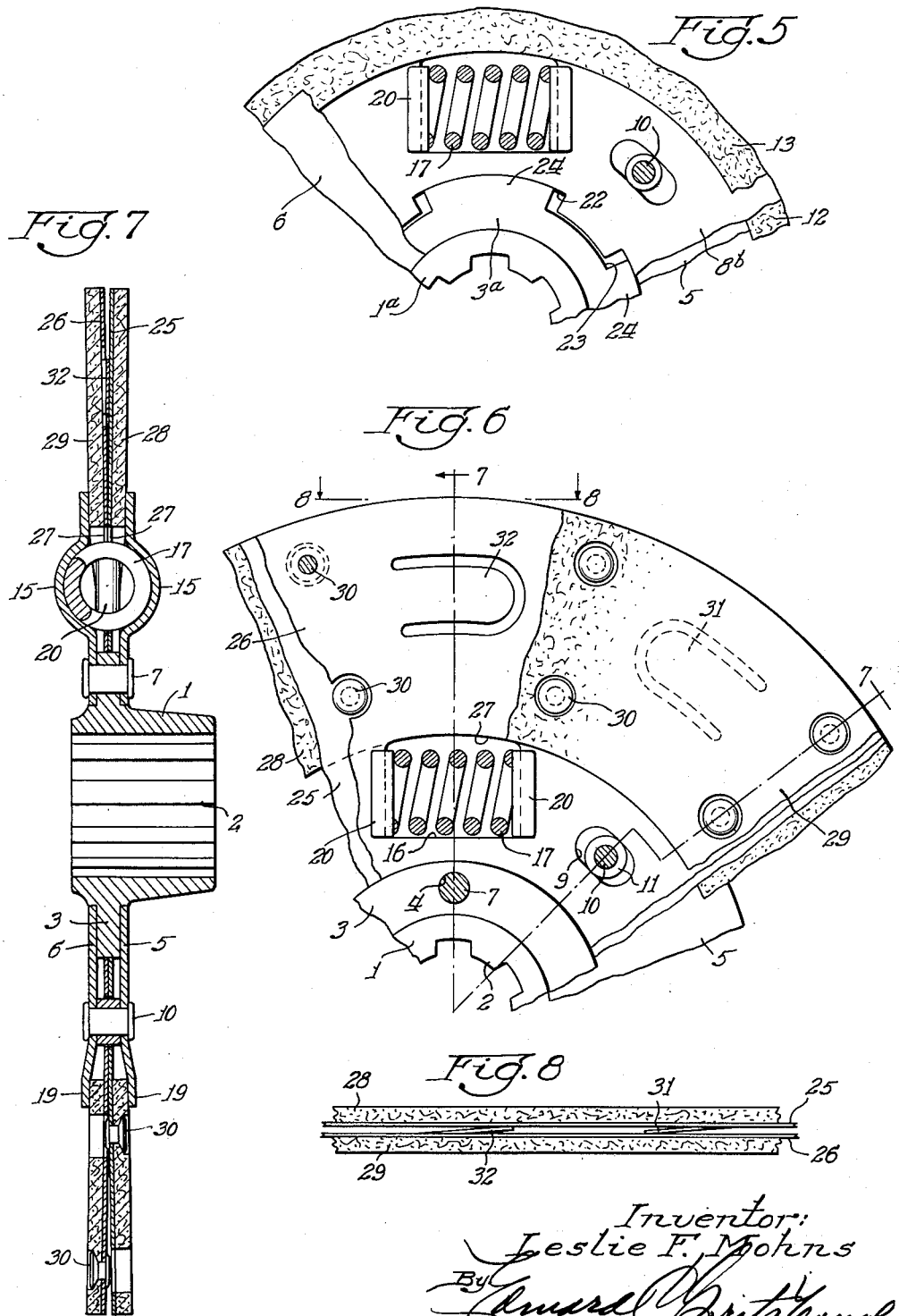

Patented Oct. 14, 1952

2,613,785

UNITED STATES PATENT OFFICE 2,613,785

CLUTCH PLATE WITH VIBRATION DAMPENER

Leslie F. Mohns, Rockford, Ill., assignor to Borg-Warner Corporation, Chicago, Ill., a corporation of Illinois Application July 10, 1947, Serial No. 759,959

8 Claims. (Cl. 192—107)

This invention relates to clutches and more particularly to clutch members of the driven type. The invention is directed particularly to clutch driven members for use in automotive vehicles.

An object of the invention is to provide an improved driven clutch member having structure to dampen vibration and to provide a cushion drive during the transmission of driving power from one rotary element to another.

Another object of the invention is to provide an improved clutch driven member in the form of a friction clutch plate incorporating a vibration dampening arrangement including a yieldable torque transmitting arrangement with a friction control therefor.

A further object of the invention is to provide a friction clutch plate incorporating coil springs disposed between two relatively movable members of the clutch plate for dampening vibration and for yieldingly transmitting torque between the members, one of said members being provided with spring abutment elements to afford more wear area for the ends of the springs.

Another object of the invention is to provide a friction clutch plate having friction facings mounted for axial movement relative to each other by means of supporting resilient discs providing improved cushioning means adapted to yieldingly resist relative axial movement of the facings for insuring gradual and progressive engagement of the clutch plate with the associated driving members of a clutch and substantial equalization of wear of the friction facings.

Other objects, the advantages and uses of the invention will be apparent after reading the following specification and claims, and after examination of the drawings forming a part of the specification, wherein:

Fig. 1 is a partial side elevational view of a friction clutch plate constructed in accordance with the invention, with some parts of the clutch plate cut away to show internal features of construction;

Fig. 2 is a transverse section of the plate viewed on the line 2—2 of Fig. 1;

Fig. 3 is a sectional view on line 3—3 of Fig. 1;

Fig. 4 is a sectional view similar to the lower half of Fig. 2 and showing a modified form of the invention;

Fig. 5 is a partial side elevational view of another clutch plate showing a modified form of the stop means for limiting relative movement between the friction facings support and the hub member;

Fig. 6 is a partial side elevational view of another clutch plate illustrating another modified form of the invention;

Fig. 7 is a transverse sectional view on line 7—7 of Fig. 6; and

Fig. 8 is an edge view taken along the line 8—8 of Fig. 6.

The drawings are to be understood to be more or less of a diagrammatic character for the purpose of disclosing typical or preferred forms of the invention contemplated herein.

The clutch member, illustrated in Figs. 1 to 3, inclusive, comprises a hub 1 which may be splined interiorly at 2 for a sliding connection with a shaft, usually a driven shaft. The hub 1 has a flange 3 of relatively small radial extent and which is provided with apertures 4. Disposed on opposite sides of the radial flange 3 are a pair of annular spring housing plates 5 and 6 secured to said flange by means of rivets 7 which extend through the apertures 4 and aligned openings in the inner peripheries of the plates 5 and 6.

Received between the plates 5 and 6 is an annular mounting plate or disc 8 surrounding the flange 3 of the hub member 1 and slidingly engaging the same. The disc 8 is provided with elongate openings 9 arranged in annular array about its central aperture for receiving rivets 10 extending through openings 9 in the disc 8 and through registering circular openings in the plates 5 and 6 for securing the disc 8 to the plates 5 and 6. Washers 11 are interposed between the two plates 5 and 6 and extend through the openings 9 of the disc 8 to maintain the plates 5 and 6 in spaced relation to the disc 8. It will be apparent that due to the elongate opening in the disc 8, the disc may have rotative movement relative to the hub 1 and the spring plates 5 and 6. The disc 8 is provided with friction facing rings 12 and 13 secured thereto by means of rivets 14.

The plates 5 and 6 are provided with radially disposed pairs of recesses or pockets 15, 15 of semi-cylindrical form registering with substantially rectangular openings 16 in the disc 8. The pockets 15, 15 form housings for coil springs 17, one in each pair of pockets and fitting in the registering openings 16 in the disc 8. It will be noted from a consideration of Fig. 2 that each pair of pockets 15, 15 is disposed in spaced circumferential relationship to the other pairs of pockets and are fashioned to substantially follow the contour of the enclosed spring and have end walls 18, 18 for engaging the ends of the springs which are substantially perpendicular to the plane of the spring. The plates 5 and 6 thus perform the function of transmitting torque from the hub member 1 to the disc 8 and friction facings 12 and also hold the coil springs in assembled position. A further function of the plates 5 and 6 is to exert a frictional drag to relative movement of the hub 1 and disc 8 by the plates frictionally engaging the friction facings 12 and 13 as it will be noted that the outer extremities 19, 19 of these plates diverge outwardly and engage the friction facings 12 and 13, the rivets 10 functioning to cause the extremities 19, 19 of the plates to exert pressure on the facings 12 and 13 for this purpose.

It will be noted from an examination of Fig. 2 that the extent of the frictional engagement of the plates 5 and 6 and facings 12 and 13, respectively, is dependent upon the length of the washers 11 which determines the pressure with which the plates 5 and 6 will frictionally engage the friction facings 12 and 13. By varying the lengths of the washers 11, it will be apparent that any desired pressure of the plates on the friction facings may be secured.

It will be noted from a consideration of Fig. 1 that relative movement between the hub 1 and disc 8 will be limited by the engagement of the washers with the end margins of the elongate openings 9 in the disc 8.

It will be apparent from an inspection of the drawings that torque will be transmitted from the disc 8 to the hub 1 through the medium of the springs, the springs acting to dampen the vibration in addition to transmitting power. The spring housing plates 5 and 6 by their frictional engagement with the friction facings 12 and 13 will resist relative movement between the plate 8 and the hub 1 and thereby function as a separate braking means to absorb or dampen minor engine vibrations.

In the operation of motor vehicles employing a friction clutch plate such as described, the clutch plate is frequently engaged and disengaged from the other parts of the clutch and the spring connection between the disc 8 and hub 1 will cause the same to move relative to each other. As the disc 8 is conventionally formed of spring steel, the edges 8a, 8a defining the ends of each spring-receiving opening in the disc 8 if engaged with the ends of the spring would produce substantial wear of the ends of the springs. In the improved vibration dampening arrangement shown in the drawings, abutment clips or hardened U-shaped stampings 20, 20 fit over the edges 8a, 8a of the disc 8 and provide a substantially greater wear area for the ends of the springs. It may be noted each clip is arranged with the arms of the U-shaped clip in contact with proximate portions of the plates 5 and 6 to maintain the plates in predetermined spaced relation to the disc.

The modification illustrated in Fig. 4 illustrates an arrangement wherein the friction drag feature of the plates 5 and 6 on the friction facings 12 and 13 is not required and for this purpose it will be seen that the friction facing rings 21 and 21a are only of such radial extent that the inner periphery of the rings 21 and 21a are spaced from the diverging outer edges of the plates 5 and 6.

The modification of the invention illustrated in Fig. 5 is directed to providing an alternative positive stop means for limiting relative movement between the hub 1a and the annular friction facings support member 8b. For this purpose, elongate notches 22 are provided in the inner periphery of the disc 8b and the outer periphery of the radial flange 3a of the hub 1a is also provided with elongate notches 23 of substantially less extent than the elongate notches 22 in disc 8b whereby the flange 3a is provided with radially disposed lugs 24 extending within the notches 22 of the disc 8b for engagement with the ends of the notches 22 to limit relative movement between the hub 1a and the disc 8b as the springs are fixed. This movement may be controlled and dampened by the frictional drag realized by pressure of the plates 5 and 6 against the outer facings 12 and 13 as previously described.

The embodiment of the invention illustrated in Figs. 6, 7 and 8 employs the vibration dampening structure of Fig. 1 and like parts are identified by the same numerals. Referring to Figs. 6, 7 and 8, a pair of thin spring steel discs 25 and 26 surround the annular flange 3 of the hub 1 and pairs of aligned openings 27, 27 are provided in these discs for receiving springs 17 in the pockets 15, 15 in the spring housing plates 5 and 6. Each of the plates 25 and 26 are provided with annular facings of friction material, the discs 25 and 26 having the friction facings 28 and 29, respectively, secured thereto by means of rivets 30 as shown in Fig. 7. To improve the action of the clutch by accelerating the initial part of the engaging movement and the finishing part of the disengaging movement and at the same time providing the smoothness of action which is desirable in clutches for automobiles, the disc 25 is suitably slotted to form a plurality of tongues 31 which are struck from the disc 25 and disposed to one side of the plane of the disc, each tongue being of U or horseshoe shape and being directed circumferentially of the disc in one direction. The disc 26 is also suitably slotted to form tongues 32 of U-shape which are struck from the disc 26 and disposed to one side of the plane of the disc and extend circumferentially of the disc in spaced relation to the tongues 31 on the disc 25 and in a direction opposite to that of the tongues 31 of the disc 25. As the flexible tongues on each plate are offset from the plane of the plate and extend outwardly toward the other plate, and the spring abutment clips 20, 20 hold the plates together inwardly of the facings, the tongues will cause the outer peripheral regions of the plates to be spread apart and to diverge in a radially outward direction so that when the driving members of the clutch are pressed toward each other to pack the driven member between them, the first contact is made at the outer peripheral edges of the facings. When the discs move axially toward each other, the tongues will flex to cushion the initial engagement of the clutch and when the discs are flexed to substantial parallelism in the final clutch engaged position a substantial portion of the area of the friction rings will contact the driving members. The clutch action resulting from the gradual and progressive increase of engaging area from initial to complete clutch engagement will provide a cushioning effect desirable in clutch plates of the type described. It will be apparent that the tongues on the discs will flex to yieldingly separate the discs to avoid chatter and dragging in the clutch during disengagement.

It will be noted that the radially outwardly diverging peripheries of the spring plates 5 and 6 engage the adjacent portions of the friction facing rings 28 and 29 to provide a frictional drag to any relative movement between the discs 25, 26 and the plates 5, 6.

While I have described my invention in connection with various specific embodiments thereof, it is to be understood that this is by way of illustration and not by way of limitation and the scope of my invention is defined solely by the appended claims which should be construed as broadly as the prior art will permit.

I claim:

1. A vibration dampener for a clutch driven plate comprising a hub having a flange; plates on opposite sides of said hub flange; means anchoring said plates to said hub flange; a disc on said hub between said plates and extending radially outwardly beyond the margins of said plates, said disc and said plates having circumferentially spaced registering openings therein; coil springs in said openings, said springs effecting a driving connection between said disc-like means and plates and being adapted to effect limited relative rotation between said disc-like means and plates; and abutment clips of U-section at opposite radial end margins of the openings in said disc for engaging the ends of said springs; the arms of the U-section extending along the sides of said disc and spacing said plates axially from the adjacent sides of said disc.

2. A clutch member comprising a hub having a flange; plates at opposite sides of said hub flange; means anchoring said plates to said hub flange; resilient sheet metal disc-like members carried by said hub between said plates and extending radially outwardly beyond the margins thereof, said disc-like members and said plates having registering openings; friction facings carried by said resilient sheet metal members; braking means on each member; coil springs in said openings, said springs effecting a driving connection between said members and plates and being adapted to effect limited relative rotation between said members and plates; abutment clips at opposite margins of the openings in said members engaging the ends of said spring and spacing said plates from said disc-like members, said clips drawing said members together inwardly of said facings; and cushion means on each member extending toward the other member to spread the members apart and effect a diverging thereof and said braking means in an outward direction to resist relative rotation between said members and said plates.

3. A clutch member comprising a hub having a flange; plates at opposite sides of said hub flange; means anchoring said plates to said hub flange; resilient sheet metal disc-like members carried by said hub between said plates and extending radially outwardly beyond the margins thereof, said disc-like members and said plates having registering openings; friction facings carried by said disc-like members; braking means on each member; coil springs in said openings, said springs effecting a driving connection between said members and plates and being adapted to effect limited relative rotation between said members and plates; abutment clips at opposite margins of the openings in said members engaging the ends of said springs and spacing said plates from said disc-like members, said clips drawing said members together inwardly of said facings; and cushion means on each member extending toward the other member to spread the members apart and diverging in an outward direction, said plates having outer peripheral portions thereof in frictional engagement with said braking means for resisting relative rotation between said members and said plates.

4. A clutch member comprising a hub having a radial flange; plates anchored to opposite sides of said hub flange; a pair of annular friction facings arranged with their inner circumferential regions frictionally contacting the outer circumferential regions of said plates to permit relative rotative movement between said facings and plates; resilient sheet metal disc-like members contacting each other between said plates and secured at their radially outer regions to said facings; yieldable vibration dampener means providing a driving connection between said members and plates and including circumferentially elongate registering openings in said members and plates; U-shape clips at the radial ends of the openings in said members arranged with the arms of the U holding the radially inner regions of said members in intimate contact with each other; and cushion means on each member urging said members axially away from each other to normally position the outer regions of said members in inwardly converging planes to oppose the pressure of said cushions against said facings and thereby effect a braking action between said plates and facings resisting relative rotation therebetween.

5. In a clutch driven member, a hub having a radial flange; plates anchored to said hub flange; resilient sheet metal disc-like members carried by said hub between said plates and extending radially outwardly beyond the margins of said plates for supporting clutch facings; cushions on each disc-like member extending toward the other member to yieldably separate said members, said members overlapping said plates and having circumferentially elongate apertures registering with apertures in said plates; and clips of U-shape section engaged with the end margins of the openings in said members for drawing together into surface contact the inner regions of said members which lie between said plates, said clips acting in opposition to said cushions which spread said outer regions of the members apart thereby effecting a radially inward divergence of said members.

6. A vibration dampener and brake assembly comprising a rotatable support having a radial flange; radial plates anchored to opposite sides of said flange; resilient sheet metal disc-like members between said plates in surrounding relation to said flange, said members being yieldably held apart beyond said plates; vibration dampener means providing a yieldable driving connection between said members and plates and including circumferentially elongate registering openings in said members and plates; braking means between said members and the outer regions of said plates; clips of U-section at the radial ends of the openings in said members arranged with the arms of the U-section holding the radially inner regions of said members in intimate contact with each other; and means radially outward from said flange tying together the outer regions of said plates to exert pressure against said braking means.

7. A vibration dampener and brake assembly comprising a rotatable support having a radial flange; plates anchored to opposite sides of said flange; resilient sheet metal disc-like members carried by said support between said plates and extending radially beyond the outer peripheries of said plates, said disc-like members and said plates having registering openings; braking means between and contacting said members and the radial outer regions of said plate; coil springs in said openings, said springs effecting a driving connection between said members and plates and being adapted to effect limited relative rotation therebetween; abutment clips at opposite radial margins of the openings in said members and engaging the ends of said springs and also spacing said plates from said disc-like members, said clips drawing said members together inwardly of the outer peripheries of said plates; means for spreading apart the outer regions of said members beyond said plates; and means tying said plates together inwardly of said braking means to exert pressure against said braking means.

8. A vibration dampener and brake assembly as defined in claim 7 wherein the braking means comprise friction elements carried by said members and in frictional contact with said plates.

LESLIE F. MOHNS.

REFERENCES CITED

The following references are of record in the file of this patent:

UNITED STATES PATENTS

| Number | Name | Date |
| --- | --- | --- |
| 1,837,173 | Reed | Dec. 15, 1931 |
| 1,931,065 | Drude | Oct. 17, 1933 |
| 1,952,892 | Reed | Mar. 27, 1934 |
| 1,967,344 | Worner | July 24, 1934 |
| 2,058,575 | Drude | Oct. 27, 1936 |
| 2,107,741 | Reed | Feb. 8, 1938 |
| 2,158,244 | Minstretta | May 16, 1939 |
| 2,274,174 | Wemp | Feb. 24, 1942 |
| 2,318,620 | Nutt | May 11, 1943 |
| 2,321,941 | Rose | June 15, 1943 |
| 2,380,835 | Goodwin | July 31, 1945 |
| 2,397,642 | Blazek et al. | Apr. 2, 1946 |

FOREIGN PATENTS

| Number | Country | Date |
| --- | --- | --- |
| 216,565 | Switzerland | Dec. 16, 1941 |
| 512,009 | Great Britain | Aug. 29, 1939 |
| 844,251 | France | July 21, 1939 |